(12) United States Patent
Möttönen

(10) Patent No.: US 11,734,535 B2
(45) Date of Patent: Aug. 22, 2023

(54) METHOD OF CORRECTING A GEOMETRICALLY DISTORTED QR CODE

(71) Applicant: Kuvio Automation Oy, Jyväskylä (FI)

(72) Inventor: Keijo Möttönen, Tampere (FI)

(73) Assignee: Kuvio Automation Oy, Jyvaskyla (FI)

( * ) Notice: Subject to any disclaimer, the term of this patent is extended or adjusted under 35 U.S.C. 154(b) by 0 days.

(21) Appl. No.: 17/618,275

(22) PCT Filed: Jun. 2, 2020

(86) PCT No.: PCT/FI2020/050378
§ 371 (c)(1),
(2) Date: Dec. 10, 2021

(87) PCT Pub. No.: WO2020/249856
PCT Pub. Date: Dec. 17, 2020

(65) Prior Publication Data
US 2022/0309266 A1    Sep. 29, 2022

(30) Foreign Application Priority Data

Jun. 14, 2019  (FI) ..................................... 20195512

(51) Int. Cl.
*G06K 7/14* (2006.01)
*G06K 19/06* (2006.01)
*G06T 5/00* (2006.01)

(52) U.S. Cl.
CPC ......... *G06K 7/1473* (2013.01); *G06K 7/1417* (2013.01); *G06K 19/06037* (2013.01); *G06T 5/006* (2013.01)

(58) Field of Classification Search
CPC ............... G06K 7/1417; G06K 7/1473; G06K 19/06037; G06T 5/006
See application file for complete search history.

(56) References Cited

U.S. PATENT DOCUMENTS

| 6,814,291 | B1 | 11/2004 | Cordery et al. |
| 2012/0145779 | A1 | 6/2012 | Bietenbeck et al. |
| 2015/0090794 | A1 | 4/2015 | Zhang et al. |
| 2019/0108379 | A1 | 4/2019 | Bachelder et al. |

OTHER PUBLICATIONS

Finnish Patent and Registration Office, Office Action, Application No. 20195512, dated Feb. 14, 2020, 8 pages.
(Continued)

*Primary Examiner* — Laura A Gudorf
(74) *Attorney, Agent, or Firm* — Ziegler IP Law Group

(57) ABSTRACT

A method for correcting a geometrically distorted QR code includes oversampling modules of the QR code by dividing each module to F*F sample elements for forming an oversampling matrix, determining intensity for each sample element in the oversampling matrix, calculating an average intensity of the oversampling matrix, subtracting the average intensity from intensity of each sample element in the oversampling matrix, filtering intensity values for determining an average value for each sample element, tracking a sample element corresponding a center of each module and determining color of each module based on intensities of sample elements corresponding the center of each module by using recursion. The disclosure further relates to a computer program product and device performing the method.

12 Claims, 7 Drawing Sheets

(56) References Cited

OTHER PUBLICATIONS

International Preliminary Report on Patentability, Finnish Patent and Registration Office, Application No. PCT/FI2020/050378 dated Oct. 13, 2021, 71 pages.

International Search Report, Finnish Patent and Registration Office, Application No. PCT/FI2020/050378, dated Sep. 7, 2020, 5 pages.

Kamizuru et al. "Belief-Propogation-Based Robust Decoding for Two-Dimensional Barcodes to Overcome Distortion and Occlusion and Its Extension to Multi-View Decoding" IEEE International Conference on Image Processing, Sep. 27, 2015, Retrieved from https://ieeexplore.ieee.org/document/7351224, 5 pages.

Lopez-Rincon et al. "Binary Large Object-Based Approach for QR Code Detection in Uncontrolled Environments" Hindawi, Journal of Electrical and Computer Engineering, vol. 2017, Article ID 4613628, https://doi.org/10.1155/2017/4613628, Published Jul. 16, 2017, 16 pages.

Nakamura et al. "Agent-based Two-dimensional Barcode Decoding Robust against Non-uniform Geometric Distortion" 7th International Conference of Soft Computing and Pattern Recognition, Nov. 13-15, 2015, Fukuoka Japan, doi: 10.1109/SOCPAR.2015.7492804, 6 pages.

Unknown Author, "QR Code Essentials" Denso-ADC, 2011, Internet Archive May 12, 2013, Retrieved from https://web.archive.org/web/20130512180619/http:www.nacs.org/LinkClick.aspx?fileticket=D1FpVAvvJuo%3d&tabid=1426&mid=4802, 12 pages.

Written Opinion of the international Searching Authority, Finnish Patent and Registration Office, Application No. PCT/FI2020/050378, dated Sep. 7, 2020, 9 pages.

Xuan et al. "Research on Correcting Algorithm of QR Cod Image's Distortion" 2017 17th IEEE International Conference on Communication Technology, Oct. 27, 2017, XP033340241, https://ieeexplore.ieee.org/document/8359930, DOI: 10.1109/ICCT.2017.8359930, 5 pages.

Written Opinion of the International Preliminary Examining Authority, Finnish Patent and Registration Office, Application No. PCT/FI2020/050378, dated May 7, 2021, 9 pages.

European Patent Office, Supplementary European Search Report, Application No. EP20820771, dated Jun. 15, 2023, 8 Pages.

Zhibo Yang et al: "Robust and Fast Decoding of High-Capacity Color QR Codes for Mobile Applications", ARXIV.ORG, Cornell University Library, 201 Olin Library Cornell University Ithica, NY 14853, Apr. 21, 2017 (Apr. 21, 2017), XP081305756.

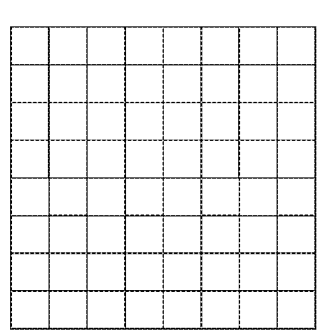
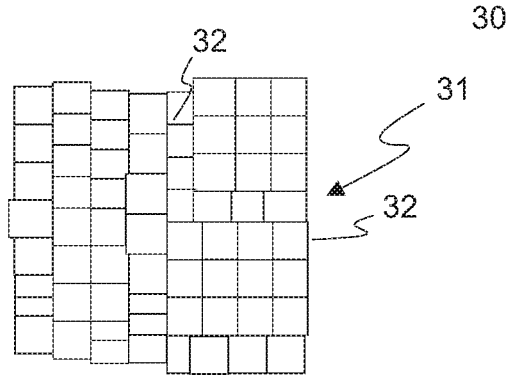
FIG. 3a    FIG. 3b
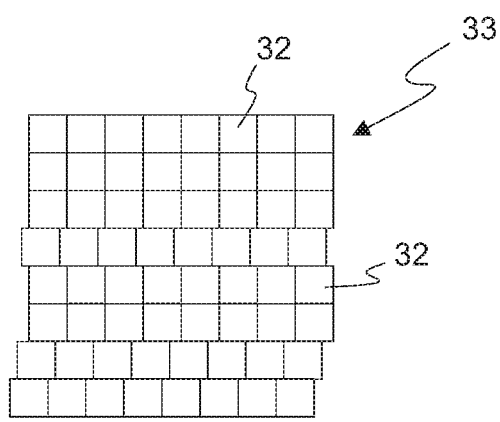
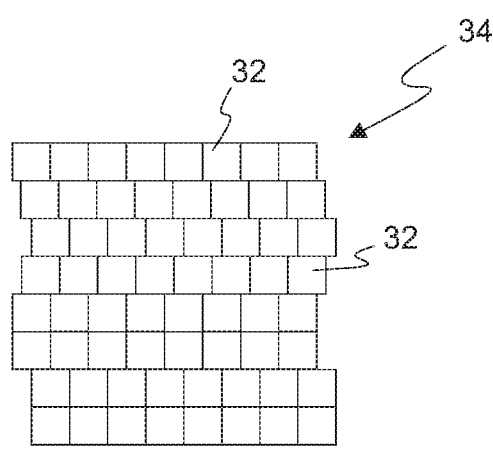
FIG. 3c    FIG. 3d
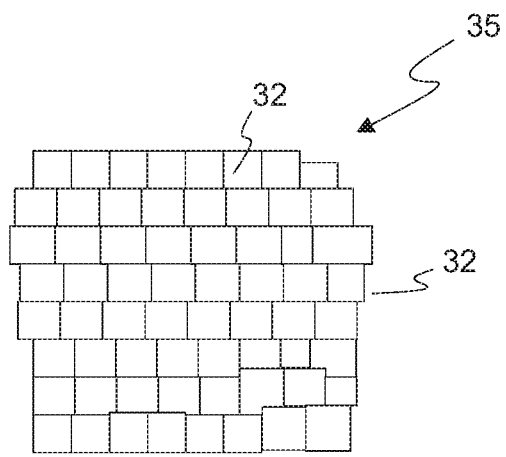
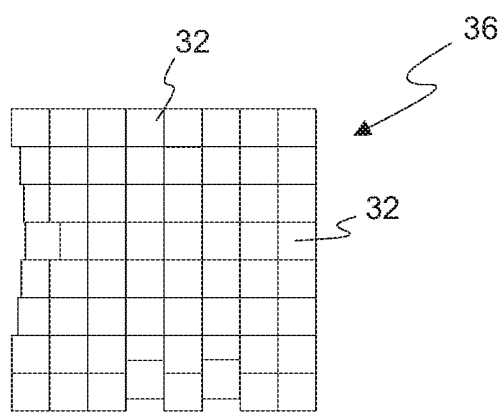
FIG. 3e    FIG. 3f

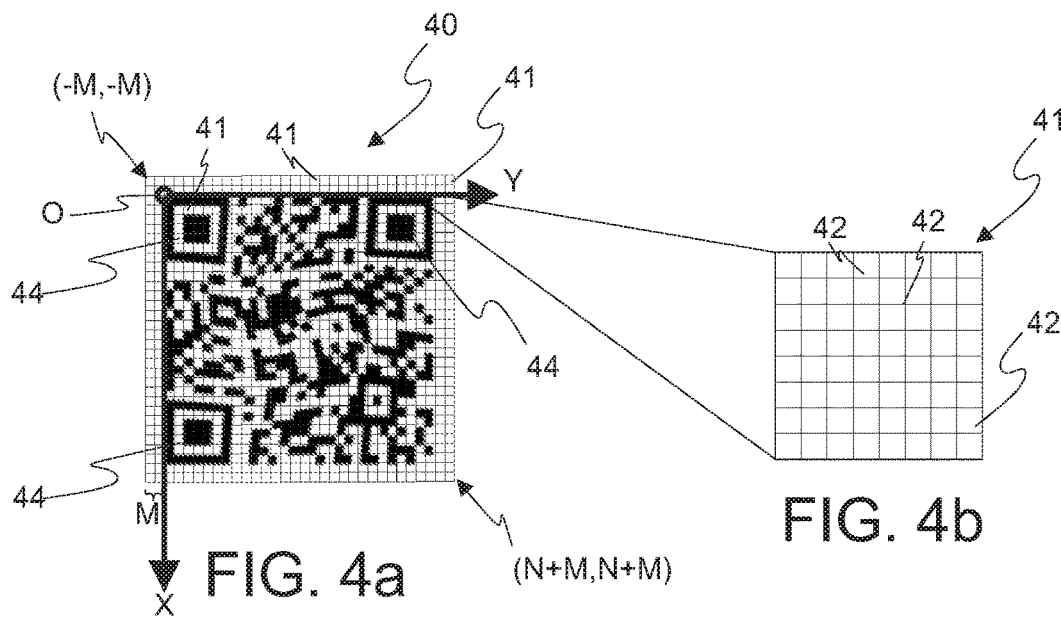
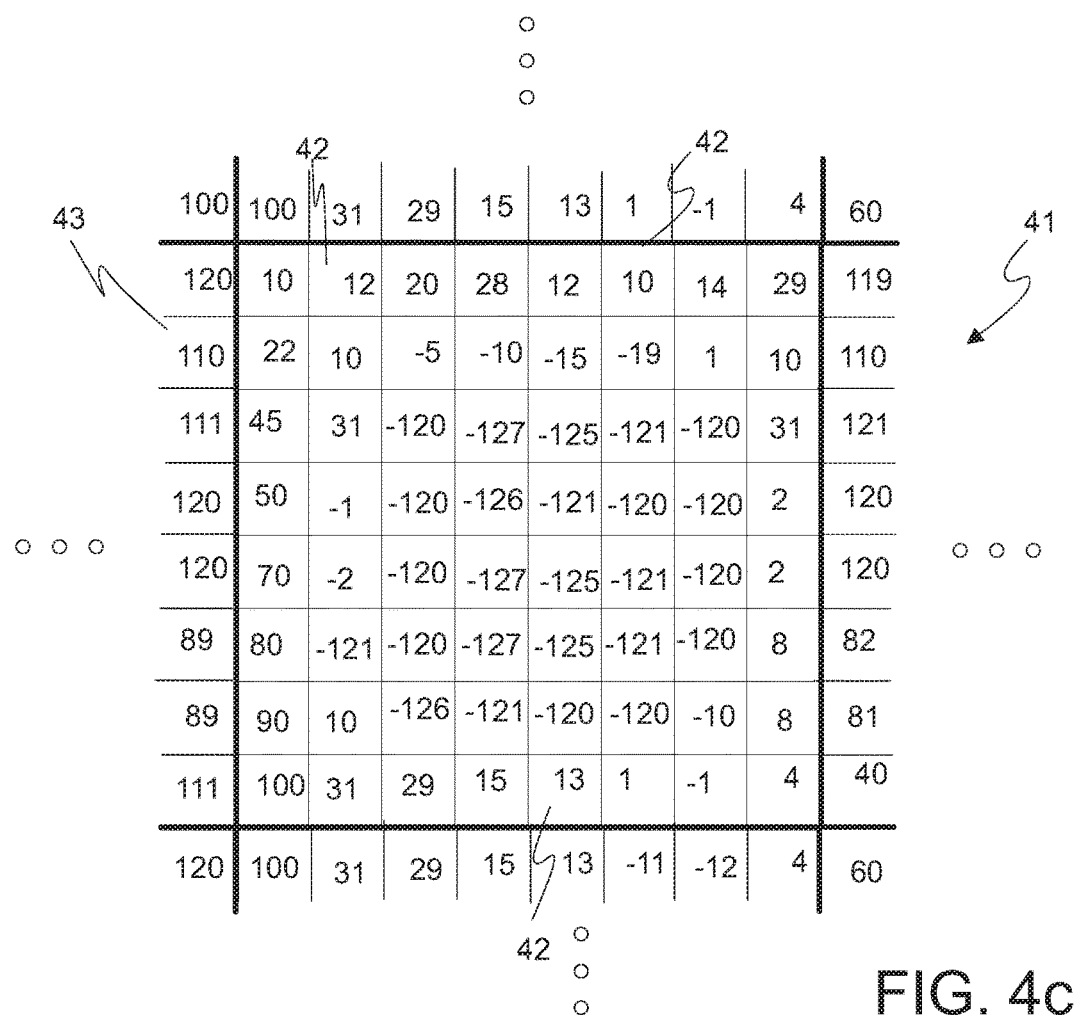

METHOD OF CORRECTING A GEOMETRICALLY DISTORTED QR CODE

TECHNICAL FIELD

The aspects of the disclosed embodiments relate to a method for correcting a geometrically distorted quick response code, QR code, of an image for reading and interpreting the code.

The aspects of the disclosed embodiments also relate to a camera system and a computer program product causing an apparatus to carry out the method.

BACKGROUND

In many environments and cases, there are situations when a quick response code, a QR code, is unintentionally distorted i.e. warped or twisted. It may be, for example arranged on a concave or convex surface or there may be a hump or a pit under the code, which causes a distortion to a pattern of the QR code. Distorted QR code may be hard on even impossible to read.

Nowadays there exist methods that are capable to correct imaged QR codes that are arranged on a convex or curved surface or substrate for reading, when the surface distortion angle is known or if the surface distortion angle can be determined from the captured image of the QR code. However, QR code may have more than one distortion and/or different type of distortions than a distortion caused by the convex or curved surface.

There is, therefore, a need for a method that is capable for correcting imaged QR codes having a distortion that is caused by a convex or curved substrate or QR codes having random or more than one type of distortion.

SUMMARY

Now there has been invented an improved method and technical equipment implementing the method. Various aspects of the disclosed embodiments include a method, a device, and a computer readable medium comprising a computer program stored therein, which are characterized by what is stated in the independent claims. Various embodiments of the present disclosure are disclosed in the dependent claims.

According to a first aspect of the disclosed embodiments, there is provided a method for correcting a geometrically distorted QR code (40) comprising a modular structure by computer means, wherein the method comprises: providing a geometrically distorted QR code (40) and position coordinates of three outer corners of the QR code (40) as an input, oversampling modules of the QR code (40) by dividing each module (41) to average F*F sample elements (42) for forming an oversampling matrix, and wherein F is an integer greater than 1, determining intensity for each sample element (42) in the oversampling matrix, calculating an average intensity of the oversampling matrix, subtracting the average intensity from intensity of each sample element (42) in the oversampling matrix, filtering intensity values for determining an average value for each sample element (42), determining a position of a sample element (42) corresponding to a center of each module (41) and determining color of each module (41) based on intensities of sample elements (42) corresponding to the center of each module (41) by using iteration, forming a queue Q comprising data structures of the modules (41), wherein data structures comprise information on the position of the center of the module (41), the color of the module (41) and position of a module (40) in the QR code (40), creating a first list of x,y coordinates of the module (x,y) (45) and its 8 neighbour modules for a data structure of module (x,y) being a first data structure in the queue Q and which center position and color are unknown, calculating a sample element corresponding an estimated center coordinate (Ex,Ey) (46) of the module (x,y) (45) based on neighbour modules whose centers are known, defining a predetermined number of offset sample element candidates OC, wherein said offset sample element candidates OC are (dx,dy), where dx and dy belong to set {−1, 0, +1}, providing a set of color combination hypotheses for modules, whose center in unknown, performing the following steps for each offset sample element candidates and for each color combination hypotheses: providing a second list comprising intensities of said offset sample element candidates OC by reading intensity of each said offset sample element candidates from the oversampling matrix at coordinate (E+OC*F), wherein E is the estimated center coordinate (Ex,Ey) (46), providing a third list of 9 color hypotheses (CH) corresponding to the intensities of sample elements in the second list, correlating the second and third lists and storing the correlation result for determining a sample element corresponding to the offset sample element candidate with highest correlation value for the center of the module (x,y) (45), and determining the color of the module (x,y) (45) by picking an intensity value of the offset sample element candidate with highest correlation value from the oversampling matrix.

According to an example, the method further comprises updating the data structure of the module (x,y) by the determined center of the module (x,y) and color information, and appending module (x,y) coordinates in list LNXY to queue Q.

According to an example, wherein the oversampling is performed by dividing each module of the QR code to F*F sample elements for forming an oversampling matrix.

According to an example, the method further comprises oversampling a margin around the QR code.

According to an example, wherein the oversampling of the margin is performed by dividing each module of the margin to F*F sample elements for a part of the oversampling matrix.

According to an example, the method further comprises reading a color information from data structures of modules for defining the information content of the QR code.

According to an example, wherein F is an integer greater or equal to 4.

According to an example, wherein the margin M determines how many modules over the QR code are processed.

According to an example, wherein color combination hypotheses comprises all possible color combinations for the modules with un-know center.

According to an example, wherein when correlated LSC and LCH lists, the elements in the lists are multiplied and summed.

According to a second aspect of the disclosed embodiments, there is provided a computer program product embodied on a non-transitory computer readable medium, the computer program product comprising computer instructions that, when executed on at least one processor of a system or an apparatus, is configured to perform a correcting method of a geometrically distorted QR code comprising a modular structure, wherein the correcting method corresponds the first aspect of the present disclosure.

According to an example, the method further comprises updating the data structure of the module (x,y) by the determined center of the module (x,y) and color information, and appending module (x,y) coordinates in the first list to queue Q.

According to an example, wherein the oversampling is performed by dividing each module of the QR code to F*F sample elements for forming an oversampling matrix.

According to an example, the method further comprises oversampling a margin around the QR code.

According to an example, wherein the oversampling of the margin is performed by dividing each module of the margin to F*F sample elements for a part of the oversampling matrix.

According to an example, the method further comprises reading a color information from data structures of modules for defining the information content of the QR code.

According to an example, wherein F is an integer greater or equal to 4.

According to an example, wherein the margin M determines how many modules over the QR code are processed.

According to an example, wherein color combination hypotheses comprises all possible color combinations for the modules with un-know center.

According to an example, wherein when correlated the second and third lists, the elements in the lists are multiplied and summed.

According to a third aspect of the disclosed embodiments, there is provided a device comprising means for performing a correcting method of a geometrically distorted QR code comprising a modular structure, wherein the correcting method corresponds the first aspect of the disclosed embodiments.

According to an example, the method further comprises updating the data structure of the module (x,y) by the determined center of the module (x,y) and color information, and appending module (x,y) coordinates in the first list to queue Q.

According to an example, wherein the oversampling is performed by dividing each module of the QR code to F*F sample elements for forming an oversampling matrix.

According to an example, the method further comprises oversampling a margin around the QR code.

According to an example, wherein the oversampling of the margin is performed by dividing each module of the margin to F*F sample elements for a part of the oversampling matrix.

According to an example, the method further comprises reading a color information from data structures of modules for defining the information content of the QR code.

According to an example, wherein F is an integer greater or equal to 4.

According to an example, wherein the margin M determines how many modules over the QR code are processed.

According to an example, wherein color combination hypotheses comprises all possible color combinations for the modules with un-know center.

According to an example, wherein when correlated the second and third lists, the elements in the lists are multiplied and summed.

According to an example, the device comprises an image sensor for capturing an image of the geometrically distorted QR code.

According to an example, the device comprises means for receiving image data of the geometrically distorted QR code.

According to an example, the device is a mobile phone, mobile computer, tablet computer or QR code scanner.

DESCRIPTION OF THE DRAWINGS

In the following, various example embodiments will be described in more detail with reference to the appended drawings, in which FIG. 3b-f show, by way of example, modules of a geometrically distorted QR code, FIG. 4a shows, by way of example, an image of a geometrically distorted QR code shown with modules arranged on the QR code image, FIG. 4b shows, by way of example, one module of an oversampling matrix and sample elements of the module after oversampling the modules shown in FIG. 4a, FIG. 4c shows, by way of example, an average intensity of samples elements of the module shown in FIG. 4b after subtraction of the average intensity.

DETAILED DESCRIPTION

Figure 1:
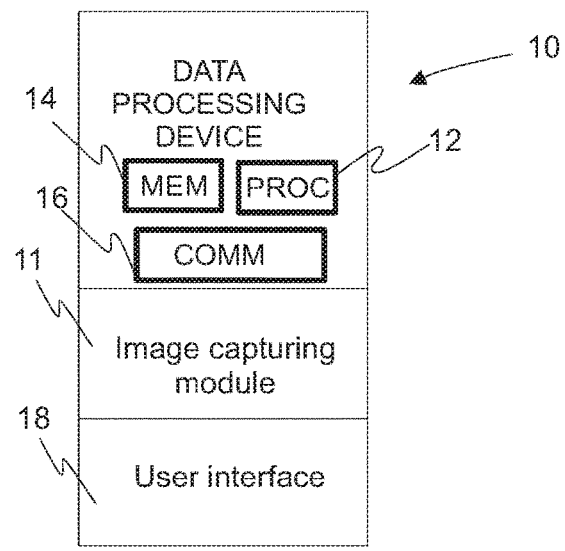
FIG. 1 shows, by way of example, a device suitable to be used for correcting a distorted QR code.

The present disclosure relates to a method according to example embodiments of the present disclosure, in the method image data of a geometrically distorted quick response (QR) code is arranged to be corrected. The image data comprises an image of the distorted i.e. skewed QR code. As such the device may not be capable to read and interpret the QR code, but the QR code in the image should be corrected i.e. undistorted in order to make the information of the QR code readable. The term "Quick Response code i.e. QR code" is a code having a form of type of matrix barcode or a two-dimensional bar. A QR code consists of black squares i.e. modules arranged in a square grid i.e. module grid on a white background, which QR code can be read by an imaging device and processed by a data processing device so that information of the QR code can be interpreted. The term "imaging device" includes in this context any image sensor suitable for capturing images and/or video i.e. image data, for example, a black and white or color camera, a regular or smart camera, or any suitable camera. Additionally, the term "image" not only comprises static images, but also comprises dynamic images, for example frames of a video In the method an image data of a geometrically distorted quick response (QR) code is provided. The image data may be received, for example from an imaging device, another device, a memory of the device, the internet or a cloud service or the image data may be captured by the device itself by its imaging device. Next a QR code area comprising modules of QR code and the margin area around the QR code i.e. the frame area around the QR code is oversampled in order to create an oversampling matrix. The width of the margin may correspond, for example width of 2 modules of the QR code. Mean i.e. average intensity of this oversampling matrix is then determined and subtracted from intensities of sample elements of the oversampling matrix so that darker and black sample elements have negative values and sample elements corresponding to white or lighter sample elements have positive values. These subtracted sample values are then linearly filtered in order to determine information indicating local maxima and local minima values occurring within sample element positions of each module. After this the positions of the modules and their center points are tracked using at least linearly filtered sample values, positions of local maxima and local minima sample values of modules, and/or known or previously determined color and center point position information of neighbor modules and color of the center points of the modules are then read from oversampling matrix for determining the color of the module. Information determined i.e. calculated by tracking i.e. module position information and color information of modules can be then be read from the corrected QR code as it could be read from a non-distorted QR code.

The method may be performed, for example by a device or a system comprising a device suitable for processing image data for correcting a geometrically distorted QR code. The term "processing" may, in this context, refer to any type of processing and/or analyzing and/or calculating and/or determining operation. Processing may refer to, for example, signal processing of image data by one or more digital signal processing algorithms. The device may comprise means for processing image data, for example the device may comprise processing circuitry and electronics for digital signal processing of image data, computer program code in a memory, and a processor that, when running the computer program code, causes the device to carry out signal processing of image data of a QR code configured to be interpreted. The data processing device may be an integrated part of the device or it may be a separate device. In addition, the device may comprise imaging means, for example at least one imaging device or means for receiving image data from other device, database or internet, cloud etc. Furthermore, the device may comprise means for performing the actions determined by the corrected QR code and relating, for example to a website to be visited or application to be performed.

The device performing the method according to example embodiments of the present disclosure i.e. the correction steps of a distorted QR code image data may be, for example any portable electronic device, for example, a smart device, a mobile phone, a smart camera, a mobile computer, a mobile collaboration device, a mobile internet device, a smart phone, a tablet computer, a tablet personal computer (PC), a personal digital assistant, a handheld game console, a QR code scanner, a portable media player, a digital video camera (DVC or digital camcorder), a pager, cellular electronic device, a non-cellular electronic device, or a personal navigation device (PND). However, it is also possible that the device is not a mobile device, it may also be any other device comprising a processing means for correcting image data of a distorted QR code according to example embodiments. It is also possible that the method may be performed, for example in the cloud service etc.

FIG. 1 shows a device 10 according to an example embodiment. In this embodiment, the device 10 comprises or otherwise is in communication with a processor 12, a memory 14, a communication interface 16, a user interface 18 and an image capturing module, such as a camera 11. The processor 12 may be embodied in a number of different ways. The processor 12 may, for example be embodied as one or more of various hardware processing means such as a coprocessor, a microprocessor, a controller, a digital signal processor (DSP), a processing element with or without an accompanying DSP, etc. The processor 12 may include one or more processing cores configured to perform independently. The processor 12 may be configured to execute instructions stored in the memory 14 or otherwise accessible to the processor 12. It is also possible that the processor 12 may be a processor of a specific device configured to employ an embodiment of the present disclosure by further configuration of the processor by instructions for performing the algorithms and/or operations described herein.

The image capturing module 11 is an optional part of the device 10. The image capturing module 11 may be, for example a camera, video camera, or any other image capturing means suitable for capturing image data of a QR code. The image capturing module 11 is in communication with the processor 12. As such, the image capturing module 11 may include all hardware, for example a lens or other optical component(s), image sensor, image signal processor, and software necessary for creating a digital image file i.e. image data from a captured image. In an embodiment, the image capturing module 11 may further comprise a processing means such as a co-processor for processing image data.

The memory 14 may comprise, for example, one or more volatile and/or non-volatile memories i.e. the memory 14 may be an electronic storage device, for example, a computer readable storage medium comprising gates configured to store data that may be retrievable by the processor 12. The memory 14 may be configured to store information, data, image data, content, applications, instructions, or the like for enabling the device 10 to carry out various functions in accordance with an example embodiment of the present disclosure. Additionally or alternatively, the memory 14 may be configured to store instructions for execution by the processor 12.

The communication module 16 may be any means such as a device or circuitry embodied in either hardware or a combination of hardware and software that is configured to receive and/or transmit data from/to a network and/or any other device or module or camera in communication with the apparatus 10. The communication module 16 may include, for example, at least one antenna and supporting hardware and/or software for enabling communications with a wireless communication network or hardware/software for enabling communication via cable, digital subscriber line (DSL), universal serial bus (USB), etc.

The user interface 18 of the device 10 may also be an optional part of the device 10 and may be in communication with the processor 12 to provide output to the user and to receive a user input. The user interface 18 may include, for example a display, a keyboard, a mouse, a touch screen, touch areas, soft keys, a microphone, a speaker, or other input/output mechanisms (not shown). The processor 12 may comprise user interface circuitry configured to control at least some functions of the user interface 18.

Figures 2A, 2B:
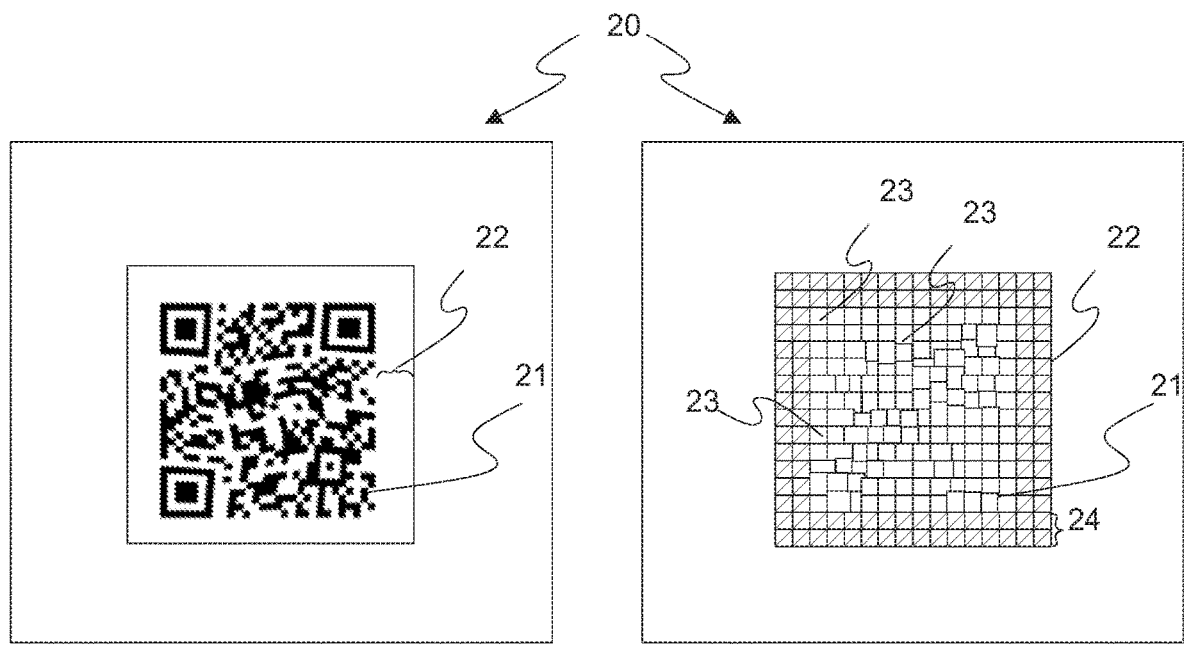
FIG. 2a shows, by way of example, an image of a geometrically distorted QR code.
FIG. 2b shows, by way of example, modules of the geometrically distorted QR code of FIG. 2a, FIG. 3a shows modules of a geometrically non-distorted QR code.

FIG. 2a shows, by way of example, an image 20 of a geometrically distorted QR code 21. The method of the present disclosure can be used for processing the image data of the QR code 21 so that it is at least less distorted and readable by a device. The image 20 is a still image. The QR code 21 of this example is bent in the middle, but its sides are straight. The margin area 22 around the QR code 21 is also shown.

FIG. 2b shows, by way of example, modules 23 of the geometrically distorted QR code 21 of FIG. 2a. From FIG. 2b, it can be seen how the modules 23 are located relative to one another and how the size of some modules 23 is different from the size of other modules. In this example, the width 24 of the margin area 22 is as wide as 2 modules, but it may be bigger, for example as wide as 3 to 4 modules. The margin area may be needed, because in some geometrically distorted QR codes at least one side may not be straight and the margin area ensures that all modules of distorted QR code are processed, when also the margin area is processed when the QR code is corrected. However, if the geometrically distorted QR code does not comprise at least one side, which is un-straight, the margin is not necessary. The margin area 22 is indicated in this example by hatched lined squares.

FIG. 3a shows modules of a geometrically non-distorted QR code 30. FIGS. 3b-f show, by way of example, modules of geometrically distorted QR codes that are distorted in different ways and that can be corrected by the method of the present disclosure. The margin areas are not indicated in these FIGS. 3a-3f. FIG. 3b shows modules 32 of a geometrically distorted QR code 31. There are modules 32 of many sizes and there are modules 32 at different levels both vertically and horizontally. Sides i.e. edges of the QR code 31 are uneven and this unevenness is the reason why margin area is needed when a geometrically distorted QR code is corrected. FIG. 3c shows modules 32 of a geometrically distorted QR code 33. Modules 32 of this QR code are almost the same size, but they are at different levels horizontally. The vertical sides of the QR code 33 are again very uneven. FIGS. 3d-f show modules 32 of geometrically distorted QR codes 34, 35 36. There are again modules 32 of many sizes and there are modules 32 at different levels both vertically and/or horizontally.

Figure 4D:
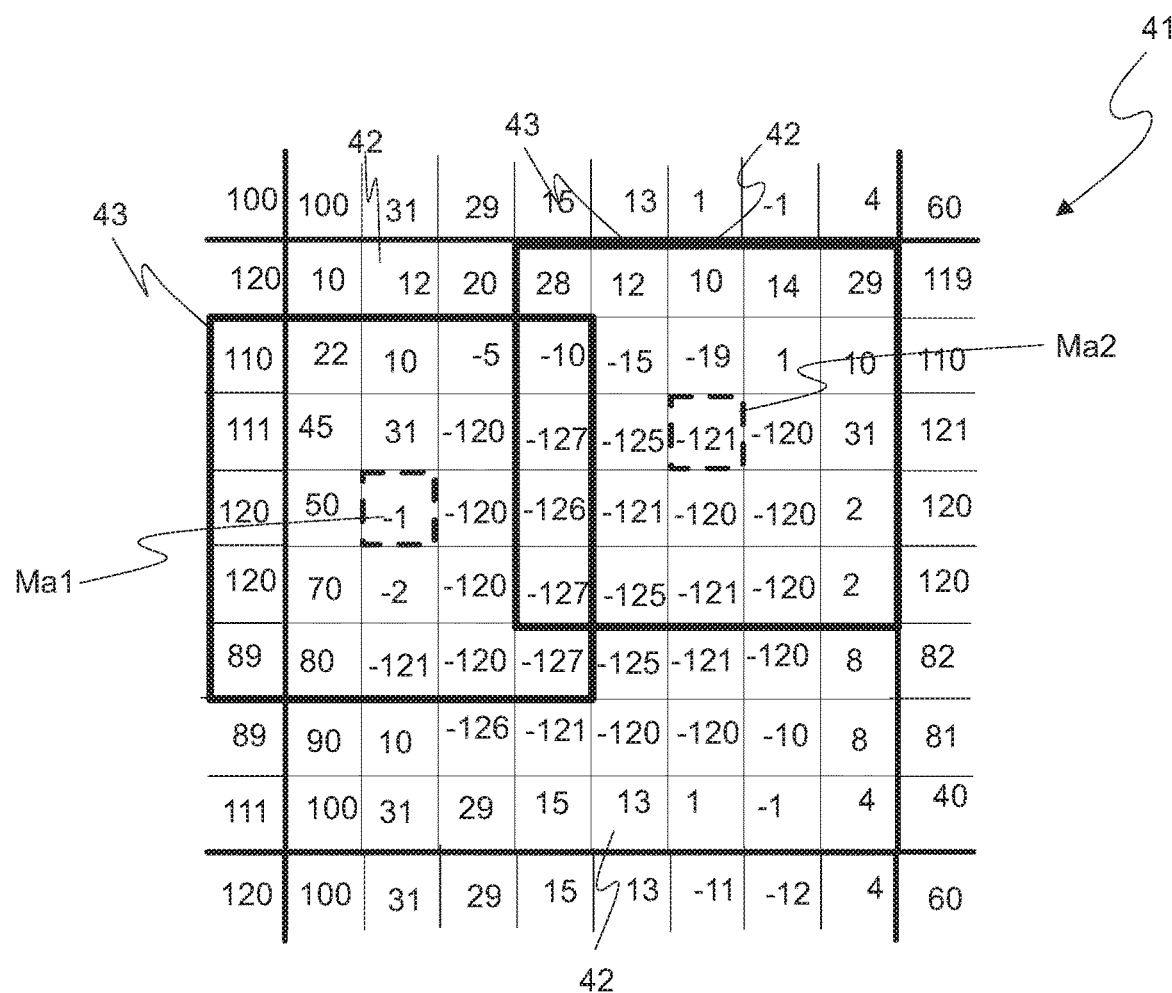
FIG. 4d shows, by way of example, two filter positions on the oversampling matrix for determining local maxima and local minima occurring in each module of the QR code arranged to be corrected for reading.
Figure 4E:
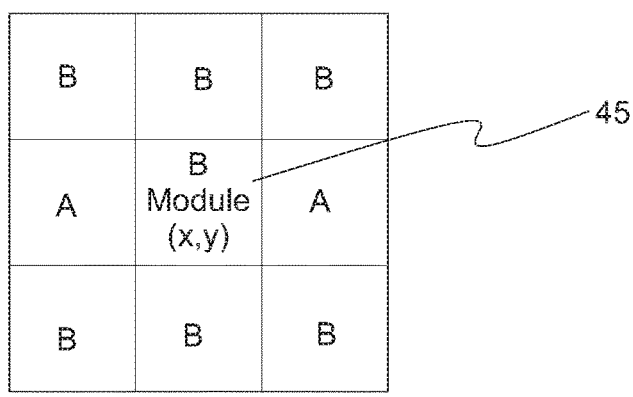
FIG. 4e shows, by way of example, a module (x,y), which data structure is under examination, and its neighbour modules comprising information about whether their color and center position are known, i.e. modules A or unknown i.e. modules B.
Figure 4F:
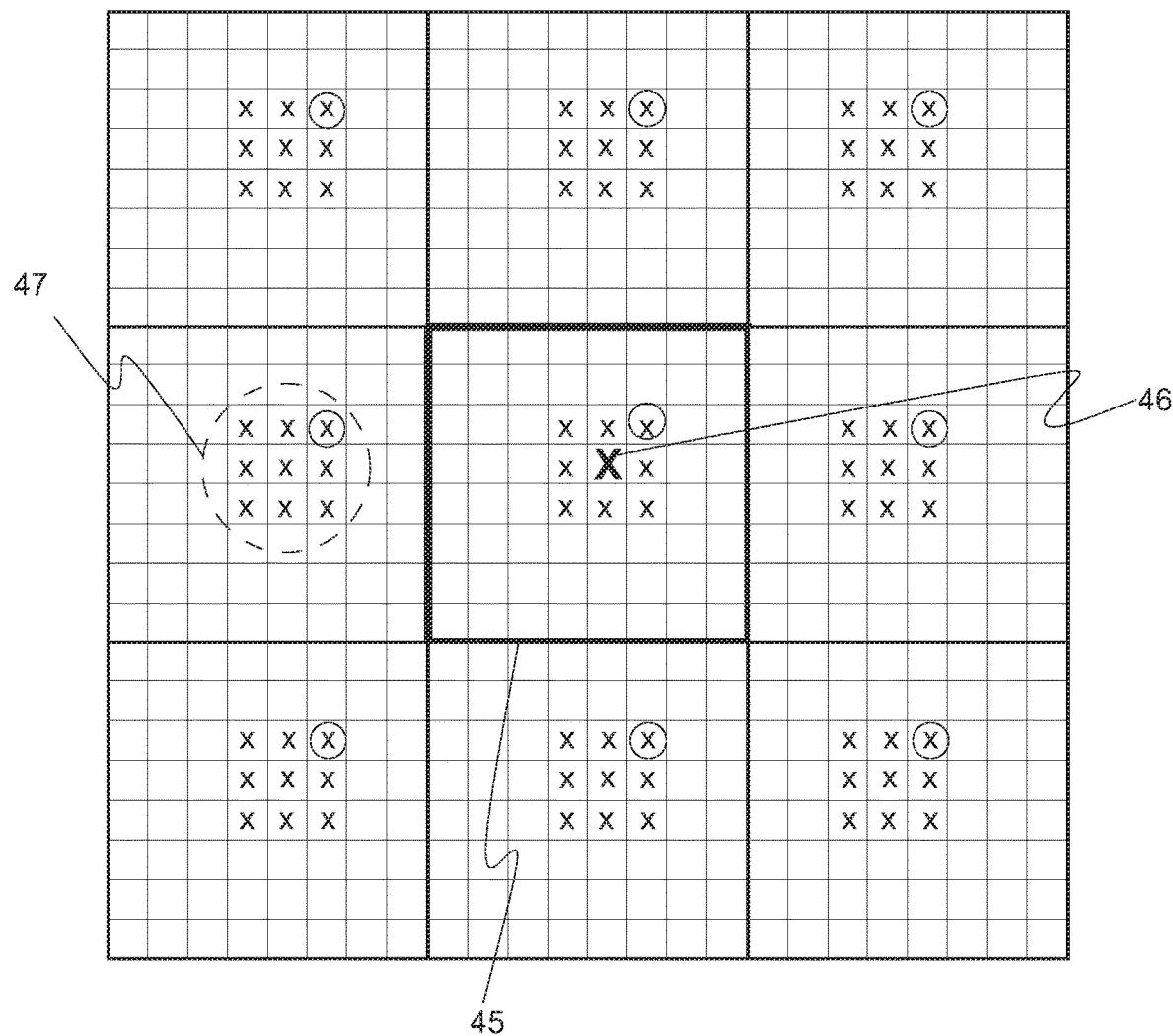
FIG. 4f shows, by way of example, an estimated center (Ex,Ey) of the module (x,y) with offset sample elements candidates around the estimated center (Ex,Ey) and corresponding locations in neighbour modules.

Here below is described, by example, a method arranged to be used for correcting a geometrically distorted QR code so that its information is readable. FIGS. 4a-4f indicate, by way of example, features discussed in context with the method. FIG. 4a shows, by way of example, an image of a geometrically distorted QR code shown with modules arranged on the QR code, FIG. 4b shows, by way of example, one module of an oversampling matrix and its sample elements of the module after oversampling the modules shown in FIG. 4a. FIG. 4c shows, by way of example, an average intensity of the sample shown in FIG. 4b after subtraction of the average intensity. FIG. 4d shows, by way of example two filter positions on the module of the FIG. 4c, wherein the filters are arranged to determine local maxima and local minima occurring in the module in the original image. FIG. 4e shows, by way of example, a module (x,y), which data structure is under examination i.e. arranged to be determined by the method, and its neighbour modules comprising information about whether their color and center position are known, modules (A) have known color and center position and modules (B) have unknown color and center position. FIG. 4f shows, by way of example, an estimated center (Ex,Ey) of the module (x,y) with offset sample element candidates around the estimated center (Ex,Ey) and corresponding locations in neighbour modules.

Image data of the distorted QR code 40 and position coordinates of those three outer corners of the QR code 40, which comprise a finder pattern 44 are input for the method.

It is assumed that the module count of the QR code 40 is known and there are N modules 41 in both X- and Y-direction, so there are N*N modules in total. Number of modules may be, for example 21 to 177 in a QR code. However, if the number of modules 41 is not known, it can be calculated by using some known method, and information that the width and height of a finder pattern is always eight modules.

The first step of the method is an oversampling step, wherein the modules 41 of the QR code area and a margin area M around the QR code are oversampled. Oversampling means that modules of the QR code area and the margin area M are divided to sample elements so that there are F*F sample elements in each module of the QR code area and the margin area M. The F is an oversampling factor and it may be selected, or it may be predefined for the method.

First, the corner of the middlemost finder pattern 44 is selected or is pre-set as the origin O, shown in FIG. 4a. (Step 1.1)

X- and Y-axes of a coordinate system are selected as directions from the origin O towards each of the other two corners comprising a finder pattern 44. These X- and Y-axes are also shown in FIG. 4a. (Step 1.2.)

The oversampling factor F is an integer greater or equal to 4, for example F=8 as in the examples of FIGS. 4a-4f, but as already said F is at least 4 or bigger than 4. The F is predefined for the method. After this the margin M is selected, or it may be predefined. The margin M determines the number of modules the correcting method overruns the expected boundaries set by the X- and Y-axes, i.e. for how many modules around the expected the QR code 40 the method steps of the method for correcting a geometrically distorted QR code are performed. M is smaller than the quiet zone i.e. the white area around the QR code. The margin M is shown in FIG. 4a (Step 1.3)

A memory is then allocated i.e. assigned for a matrix of size $((N+2*M)*F)$-by-$((N+2*M)*F)$ i.e. the oversampling matrix. (Step 1.4)

Then, the area of the QR code 40 including the area of the margin M is sampled. Sampling means that intensity is determined for each sample element in the oversampling matrix. The sampling is started from an image coordinate corresponding to module coordinate (−M,−M) (shown in image 4a) and ending to an image coordinate corresponding to module coordinate (N+M,N+M) (shown also in image 4a). There are F samples i.e. sample elements taken from the image per module 41 both in x-direction and in y-direction so that there are at least on average F*F sample elements in each module. The direction along which the sampling point moves within the image is determined by the direction of the X- and Y-axes. This procedure fills the sample elements of the oversampling matrix with their intensity values as the sampling procedure visits all (N+2M)-by-(N+2M) modules and produces $((N+2*M)*F)*((N+2*M)*F)$ sample elements. One module 41 of the oversampling matrix is shown in FIG. 4b and in the module 41 sample elements 42 are also shown and because the F=8 in this example, the number of sample elements 42 in each module 41 is 8*8=64 and this is shown in the module 41. There are 28 modules in X-axes and 28 modules in the Y-axes and the margin is 2 modules, N=28 and M=2, thus the number of sample elements of the over sampling matrix is $((28+2*2)*8)*((28+2*2)*8)$ =256*256. From now on the rest of the data processing method is performed for the oversampling matrix containing the necessary information relating, for example, to position of modules in the QR code etc. (step 1.5) It should be noted that the 28 as N is just an example of number of modules in a QR code and it is just used herein to clarify the idea of the second step.

The second step of the correcting method is an intensity step comprising average intensity determination and normalization of the intensity. First an average intensity is determined i.e. calculated for the whole oversampling matrix. This may be done in several ways, for example using the finder patterns 44 at three corners of the QR code 40, or by using the arithmetic average of the sampling matrix. (Step 2.1)

Then the average intensity is subtracted from intensity of each sample element in the oversampling matrix so that sample elements corresponding to dark and black modules become negative and sample elements corresponding to white and light modules become positive. For example, the intensity determination of sample elements of an oversampling matrix may first give intensity values between 0 to 255 for sample elements. After subtraction of the average intensity, the range is −128 to 127 so that, for example the sample element that first have an intensity value 0 corresponding black, has after subtraction an intensity value of −128 and the sample element that first have an intensity value 100 corresponding dark, has after subtraction an intensity value of −28. The intensity range is not limited to this example 0 to 255, but it can be freely selected. An example of a module 41 comprising subtracted intensity values of sample elements is shown in FIG. 4c. But it should be noted that these intensity values in the FIG. 4c are again just examples of possible subtracted intensity values of sample elements and arranged just to indicate the idea of this second step. (step 2.2)

The third step of the method relates to filtering of intensity values in the oversampling matrix. At first a kernel size K of a linear 2D filter may be selected or it may be predefined. An example of a suitable filter is a uniform 5-by-5 box filter 43 so that every filter coefficient is 1/25. The filter may have different size or shape. It is also possible to use, for example a gaussian filter instead of the box filter or any other filter suitable to be used for this filtering of intensity values. (Step 3.1)

Then the oversampling matrix and its intensity values are filtered with this filter 42. As a result, the filter calculates the mean average value for each sample element when the box filter is used and a weighted average value for each sample element when some other filter is used, which is the sample element that is the middle one inside the filter 43. The average is calculated for each sample value 42 of the oversampling matrix. If there are not enough sample elements around a sample element arranged to be filtered, then these values that remain inside the filter 43 are used for calculating the average value. Two examples of the middle one sample elements are indicated by Ma1 and Ma2 inside filters 43 in FIG. 4d. (Step 3.2)

As a consequence of this filtering operation the local maxima or local minima i.e. lowest or highest mean average values inside each module 41 are determined. It is likely that the local maxima or local minima or at least area near the local maxima or local minima comprise a position which correspond to the center of a module in the original QR code, which was not geometrically distorted, and which is also the output of the method. (Step 3.3)

The fourth step of the method relates to tracking of the positions of the modules of the distorted QR code 40. The tracking may be done, for example by using recursion. At first, when recursion is used for tracking the center positions of modules, the recursion is started by inserting the module coordinates of the known three corners to a queue denoted by Q. The known coordinates relate to the corners wherein the finder patterns 44 lie and the coordinates correspond the outer corners of these patterns 44. The outer corners are the corners of patterns 44 that are outer corners of the QR code 40. The coordinates are (0,0), (0,N−1) and (N−1,0), where N is the number of modules per direction as described in the first step. The module coordinates are different than the coordinates of sample elements of the oversampling matrix. In addition to the module coordinate, information on the position of the center of the module in terms of an oversampling matrix coordinate and the color of the module are attached i.e. stored to the data structure inserted to the queue Q. The position of the center of the module is most likely the local maxima or minima of the intensity calculated in the third step or sample element next to the local maxima or minima. By default, both the position of the center module and the color are initially marked as "unknown". (Step 4.1)

The queue Q now comprises data structures of the modules inserted into it in step 4.1. Then, for these modules or modules that are added to Q in later phase of the fourth step and for which position of the center and color are not yet determined i.e. the position of the center and color of those modules are unknown, the following steps 4.3-4.16 are performed for those modules in the queue Q one module at the time. Steps 4.3-4.16 form a recursion loop. (Step 4.2)

The first data structure (including the module coordinate, position of the center and the color) of Q is taken from the queue Q for processing. (Step 4.3)

However, if the position of the center coordinate and color of the module in a data structure in the queue Q is already known, it is, for example determined in earlier round, when steps 4.3-4.16 were performed, the next data structure in the queue Q is taken for processing i.e. the recursion continues back to step 4.3. (Step 4.4)

If the center and color of the module in a data structure are not known i.e. they are unknown, the recursion continues forward. A list of coordinates which consist of x and y (x,y) coordinates of a module and coordinates of its 8 neighbour modules is created. So the list comprises following coordinate pairs (x−1,y−1), (x,y−1), (x+1,y−1), (x−1,y), (x,y) (x+1,y), (x−1,y+1), (x,y+1), and (x+1,y+1). This list may be denoted as LNXY and the module, which data structure is currently under examination, may be called, for example module (x, y) 45 (shown in FIG. 4e). (Step 4.5)

The neighbour coordinates in the list may be separated i.e. divided into two sets, wherein set A includes neighbour modules with known position of the center and color of a module and set B includes neighbour modules with so far unknown position of the center and color of a module. The number of neighbours in sets A and B is denoted by NA and NB, respectively. NA+NB=9. Module (x,y) 45 itself belongs to set B. Modules of A and B sets are shown in FIG. 4e (Step 4.6)

Next a sample element corresponding an initial estimate for center i.e. center estimate (Ex,Ey) 46 of the module (x,y) 45 is calculated using i.e. based on information on centers of the neighbours in the set A. For example, it may be supposed that set A consists of modules (x−1,y) and (x+1,y). If the center of module (x−1,y) is a sample element at oversampled coordinate (Sx, Sy), then it may be predicted that the center of module (x,y) 45 is the sample element at oversampled coordinate (Sx+F,Sy). Correspondingly, if the center of module (x+1,y) is a sample element at oversampled coordinate (Rx,Ry), then we predict that the center of module (x,y) 45 is the sample element at oversampled coordinate (Rx−F,Ry). The final estimate is then the average of constituent estimates. In this example, the center estimate sample element would be (Ex,Ey)=(Sx+F+Rx−F, Sy+Ry)/2=((Sx+Rx)/2,(Sy+Ry)/2). (Step 4.7)

However, if set A is empty i.e. there are not any neighbour which modules center coordinates and color are known, the estimate for the center of the module (x,y) 45 may be set to be ((M+x+½)*F,(M+y+½)*F). But the set A could be empty only if coordinate (x,y) is one of the three initial coordinates pushed to the queue Q i.e. one of the outer corners of finder patterns 44 of the QR code 40. (Step 4.8)

After estimating the sample element corresponding the center estimate (Ex,Ey) 46 of the module (x,y) 45 in the step 4.8, a list of 9 offset sample element candidates x is formed i.e. offset sample element candidates x are defined. The list comprises the center estimate (Ex,Ey) 46 and 8 offset sample elements candidates x around the (Ex,Ey) 46. Offset sample elements candidates around the (Ex,Ey) 46 form an offset sample element matrix 47 into the module (x,y) 45 and into its neighbour modules. The real center of the module (x,y) 45 may not be at (Ex,Ey) 46, wherein the estimation (steps 4.7 or 4.8) determined it to be. Therefore the eight sample elements around the (Ex,Ey) 46 are also examined in addition to the sample element of the center estimate (Ex,Ey) 46 in order to determine whether the center is actually at the sample element of the center estimate (Ex,Ey) 46 or at offset sample element next to the sample element of the center estimate (Ex,Ey) 46. The offset sample element candidates are (dx,dy), where dx and dy belong to set {−1, 0, +1}. One of the offset sample elements in this list will be used to adjust the center of the module (x,y) 45 i.e. will be the actual i.e. determined center of the module (x,y) 45. When an offset sample element candidate of the module (x,y) 45 is examined for determining whether the center of the module (x,y) 45 is actually in that position, the offset sample elements in neighbour modules that are in corresponding positions in the offset sample element matrixes 47 are used in addition to the offset sample element candidate of the module (x,y). For example, if top-right offset sample element candidate of module (x,y) 45 is under examination then top-right offset sample element candidates in offset sample element matrixes 47 of neighbour modules are used. Top-right offset sample element candidates are circled in FIG. 4f. Generally in other examples of correcting method, it is possible to use instead of 9 offset sample element candidates, for example, 5 offset sample element candidates, wherein the center sample element is again the sample element of the center estimate (Ex,Ey) 46 (estimated in steps 4.7 or 4.8) and other four offset sample elements are possible positions for the center of the module (x,y) 45 in addition to the (Ex,Ey) 46. (Step 4.9)

After this, a set of all possible color combinations for the modules in set B i.e. modules, which center is still unknown are arranged to be provided. There are 2^NB possible color combinations. Within a color combination, −1 means black and +1 means white. For example, if there are 4 modules in B, the number of color combinations is 2^4=16. A possible color combination i.e. color combination hypotheses (CH) may be, for example (−1, −1, −1, +1, +1, +1, +1, +1, +1) or (−1, −1, −1, +1, +1, −1, +1, +1, +1). It can be seen from these example combinations, that in this example, first 5 colors are the same i.e. they are colors of the modules, which color is previously determined or at least known. The other, last 4, are color possibilities and now the deviation of the example combinations relates to the color of the sixth module. The first CH suggests the sixth module to be white (+1) and the second CH to be black (−1). (Step 4.10)

The following steps 4.11-4.16 are performed for each 9 offset sample element candidates (OC) of the module (x,y) 45 (estimated sample element (Ex,Ey) 46 and 8 offset sample elements around it) and for each color combination hypotheses (CH) i.e. steps 4.11-4.16 are performed 9*2^NB times, in this example 9*16 times.

A list denoted by LSC consisting of 9 intensities of sample elements of offset sample element candidates (one for each module in set A and in set B) is provided by reading a sample i.e. intensity from the oversampling matrix at coordinate (E+OC*F), where E=(Ex,Ey) 46 is the initial estimate defined at step 4.7. In other words, as explained in step 4.9 when an offset sample element candidate of the module (x,y) 45 is examined for determining whether the center of the module (x,y) 45 is actually in that position, the offset sample elements in neighbour modules that are in corresponding positions in the offset sample element matrixes 47 are used in addition to the offset sample element candidate of the module (x,y), thus in the LSC list for each offset sample element candidate 9 intensities are determined: its own intensity and intensities of the offset sample elements in neighbour modules that are in corresponding positions in the offset sample element matrixes 47. And this is done for each offset sample element candidates of the module (x,y) 45. (step 4.11)

After this a list of 9 color hypotheses (CH) corresponding to the intensities of sample elements in list LSC is provided. This list is denoted by a list of color hypotheses (LCH): for neighbour modules in set A, the known colors to LCH is copied from data structures corresponding to modules in set A and for neighbour modules in set B, the hypotheses CH to LCH is generated as illustrated in step 4.10. (step 4.12)

Then, lists LSC and LCH are correlated, and the correlation result is stored. Correlation means that elements in the lists are multiplied and summed. The higher the correlation value is, the more likely it is that the color combination hypotheses is correct and the offset sample element candidate corresponds to the center of the module. For example, if CH combination (−1, −1, −1, +1, −1, +1, +1, +1, +1) (when multiplied with the intensities of fifth sample element candidates and after summing of the multiplication results) provides the highest correlation value for the fifth offset sample element candidate corresponding the sample element of (Ex,Ey) 46, it is likely that the center of the module (x,y) 45 is in the (Ex,Ey) 46. The filtering step, the third step, described above ensures that if the color hypotheses is correct, the correlation value increases towards the center of the module and this feature is the core of the module tracking procedure. (Step 4.13)

Therefore, a sample element corresponding to the offset sample element candidate with highest correlation value may be selected for the center of the module (x,y) 45 as discussed in step 4.13. (Step 4.14)

Then, the sample element candidate selected in step 4.14 may be stored to the data structure of module (x,y) 45 as the center of the module (x,y) 45. The color at this sample element is taken from the oversampling matrix provided in the third step. This color represents the color of the module (x,y) 45 and is stored in the data structure of the module (x,y) 45. (Step 4.15)

Append module coordinates in list LNXY to queue Q see step 4.5. This ensures that the recursion will visit every module in the code. (Step 4.16)

After this, the QR code correction method continues to the fifth step that relates to reading the information of the modules. The result of the recursion is stored in a data structure for each module of the QR code. The data structure comprises the color of each module and the position of the module in the QR code 40. The color information can now be used for reading the information content of the corrected QR code, which substantially correspond the original QR before it was geometrically distorted. Sometimes it is not necessary to read the information content of the corrected QR code, but it may be stored for later use.

Figure 5:
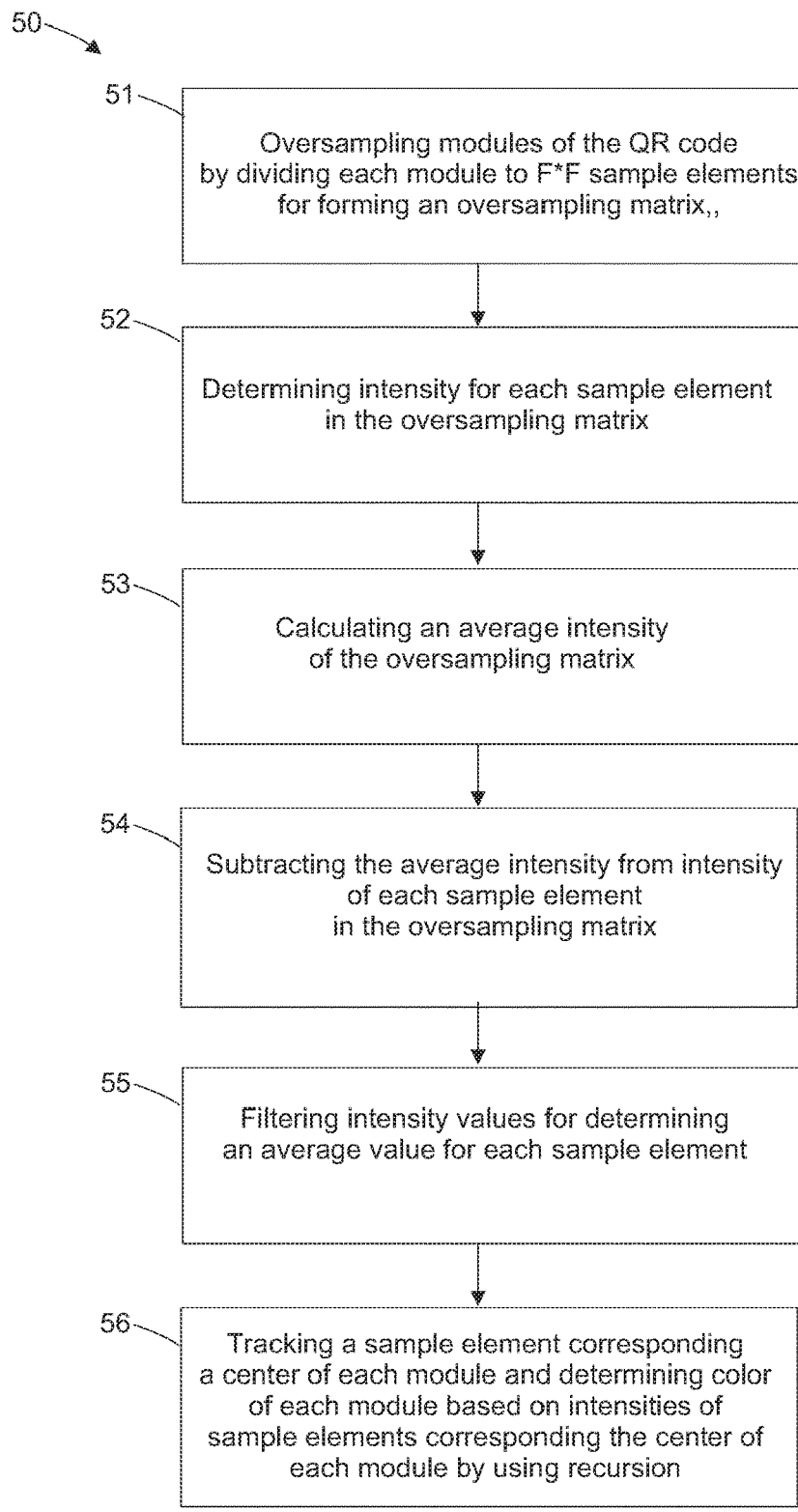
FIG. 5 shows, by way of example, steps of a method of correcting a geometrically distorted QR code.

FIG. 5 shows, by way of example, steps of a method 50 of correcting a geometrically distorted QR code comprising a modular structure. In step 51, modules of the QR code are oversampled by dividing each module to F*F sample elements for forming an oversampling matrix. In step 52, intensity is determined for each sample element in the oversampling matrix. In step 53, an average intensity of the oversampling matrix is calculated. In step 54, the average intensity is subtracted from intensity of each sample element in the oversampling matrix. In step 55, intensity values are filtered for determining an average value for each sample element. In step 56, a sample element corresponding a center of each module is tracked and color of each module is determined based on intensities of sample elements corresponding the center of each module by using recursion. The method step 56 comprises steps of recursion shown in FIG. 6.

Figure 6:
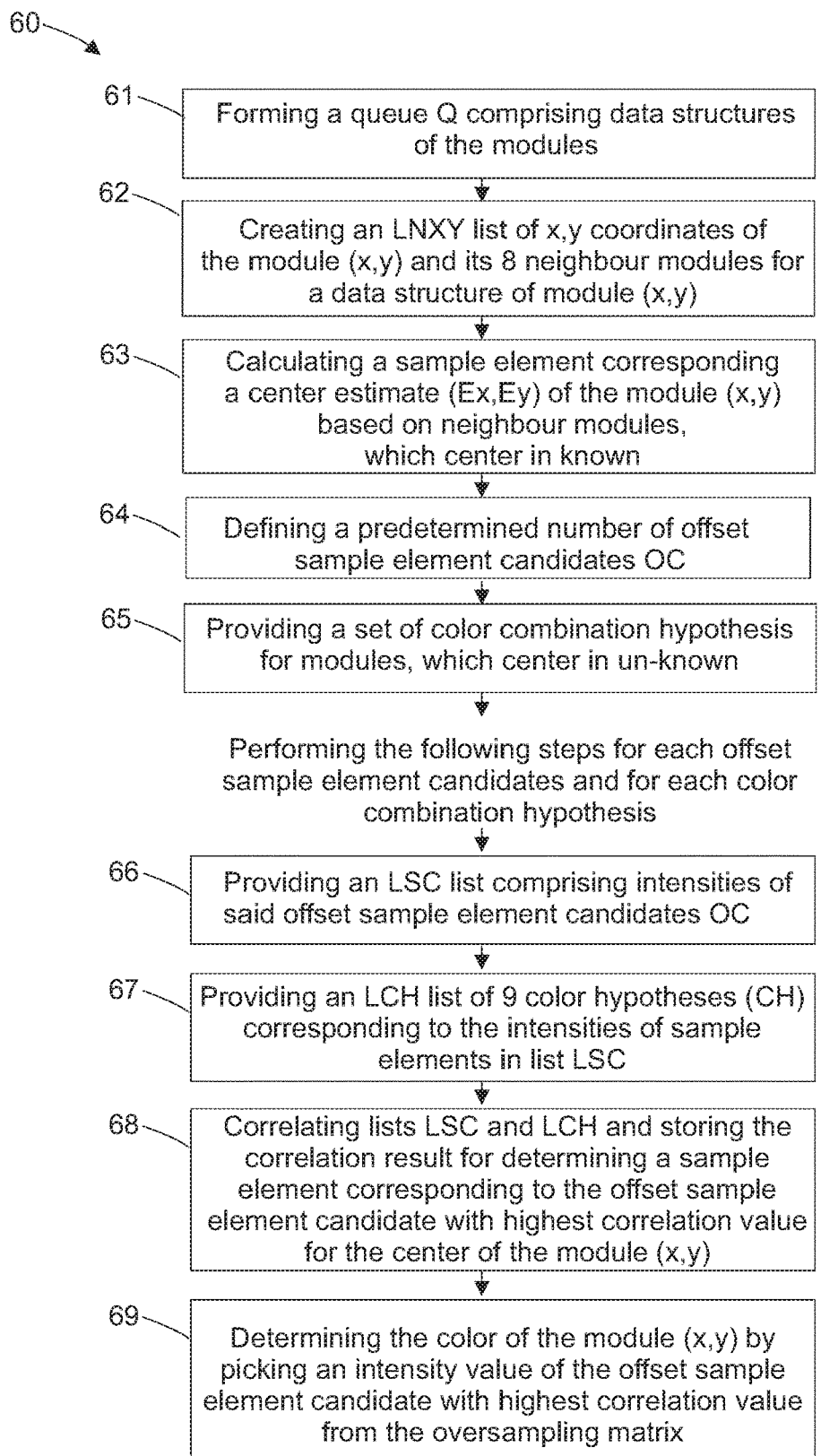
FIG. 6 shows, by way of example, steps of recursion.

FIG. 6 shows, by way of example, steps of recursion method 60. In step 61, a queue Q comprising data structures of the modules is formed. The data structures comprise information on the position of the center of the module, the color of the module and position of a module in the QR code. In step 62, an LNXY list of x,y coordinates of the module (x,y) and its 8 neighbour modules is created for a data structure of module (x,y) being a first data structure in the queue Q and which center position and color are unknown. In step 63, a sample element corresponding a center estimate (Ex,Ey) of the module (x,y) is calculated based on neighbour modules, which center in known. In step 64, a predetermined number of offset sample element candidates OC is defined. Said offset sample element candidates OC comprise the center estimate (Ex,Ey) and sample elements around the center estimate (Ex,Ey). In step 65, a set of color combination hypotheses is provided for modules, whose center in unknown. After step 65 the following steps 66-69 are performed for each offset sample element candidates and for each color combination hypotheses. In step 66, an LSC list comprising intensities of said offset sample element candidates OC is provided by reading intensity of each said offset sample element candidates from the oversampling matrix at coordinate (E+OC*F), wherein E=the center estimate (Ex,Ey). In step 67, an LCH list of 9 color hypotheses (CH) corresponding to the intensities of sample elements in list LSC is provided. In step 68, lists LSC and LCH are correlated and the correlation result is stored for determining a sample element corresponding to the offset sample element candidate with highest correlation value for the center of the module (x,y). In step 69, the color of the module (x,y) is determined by picking an intensity value of the offset sample element candidate with highest correlation value from the oversampling matrix.

In addition to use the color information of data structures for reading the information content of the QR code, it is possible to use both the color of each module and the position information of each module in the QR code 40 and reform i.e. reconstruct the surface which the QR code is printed on so that the surface is not geometrically distorted anymore. This reformed QR code may then be used, for example producing replicas of the original QR code or any other way where corrected QR code or corrected surface may be needed.

It should be noted that in some example embodiments, the order of method steps may vary, same of the method steps may be performed simultaneously and/or some of the method steps do not need to be performed.

The various example embodiments of the present disclosure can be implemented with the help of computer program code that resides in a memory and causes the relevant device to carry out the aspects of the disclosed embodiments. For example, a device may comprise circuitry and electronics for handling, receiving and transmitting image data, computer program code in a memory, and a processor that, when running the computer program code, causes the device to carry out the features of an example embodiment.

It is obvious that the present disclosure is not limited solely to the above-presented examples, but it can be modified within the scope of the appended claims.

The invention claimed is:

1. A method for correcting and interpreting an image of a geometrically distorted QR code comprising a modular structure by computer means, wherein the method comprises:

providing a geometrically distorted QR code and position coordinates of three outer corners of the QR code as an input, oversampling modules of the QR code by dividing each module to on average F*F sample elements for forming an oversampling matrix, and wherein F is an integer greater than 1, determining intensity for each sample element in the oversampling matrix the sample elements of the oversampled matrix having oversampled coordinates, wherein the method further comprises:

calculating an average intensity of the oversampling matrix, subtracting the average intensity from intensity of each sample element in the oversampling matrix, filtering intensity values for determining an average value for each sample element, determining a position of a sample element corresponding to a center of each module and determining color of each module based on intensities of sample elements corresponding to the center of each module by using iteration as follows, forming a queue Q comprising data structures of the modules, wherein data structures comprise information on the position of the center of the module, the color of the module and position of a module in the QR code, creating a first list position (x,y) of the module (x,y) and 8 neighbour modules for a data structure of module (x,y) being a first data structure in the queue Q for which center position and color are unknown, calculating a sample element corresponding an estimated oversampled coordinate (Ex,Ey) of center of the module (x,y) based on neighbour modules whose centers are known, defining a predetermined number of offset sample element candidates OC, wherein said offset sample element candidates OC are (dx,dy), where dx and dy belong to set {−1, 0, +1}, providing a set of color combination hypotheses for modules, whose center in unknown, and performing the following steps for each offset sample element candidates and for each color combination hypotheses:

providing a second list comprising intensities of said offset sample element candidates OC by reading intensity of each of the said offset sample element candidates from the oversampling matrix around E and corresponding locations of neighbour modules, wherein E is the estimated oversampled coordinate (Ex,Ey) of center of the module (x,y), providing a third list of 9 color hypotheses (CH) corresponding to the intensities of sample elements in the second list, correlating the second and third lists and storing the correlation result for determining a sample element corresponding to the offset sample element candidate with highest correlation value for the center of the module (x,y), and determining the color of the module (x,y) by picking an intensity value of the offset sample element candidate with highest correlation value from the oversampling matrix.

2. The method according to claim 1, wherein the method further comprises:

updating the data structure of the module (x,y) by the determined center of the module (x,y) and color information, and appending module (x,y) coordinates in the first list to queue Q.

3. The method according to claim 1, wherein the method further comprises oversampling a margin M around the QR code.

4. The method according to claim 3, wherein oversampling of the margin M is performed by dividing each module of the margin M to F*F sample elements for a part of the oversampling matrix.

5. The method according to claim 1, wherein the method further comprises reading a color information from data structures of modules for defining the information content of the QR code.

6. The method according to claim 2, wherein F is an integer greater or equal to 4.

7. The method according to claim 3, wherein the margin M determines how many modules over the QR code are processed.

8. The method according to claim 1, wherein when correlating the second and third lists, the elements in the lists are multiplied and summed.

9. A computer program product embodied on a non-transitory computer readable medium, the computer program product comprising computer instructions that, when executed on at least one processor of a system or an apparatus, is configured to perform a method for correcting and interpreting an image of a geometrically distorted QR code comprising a modular structure by computer means, wherein the method comprises:

providing a geometrically distorted QR code and position coordinates of three outer corners of the QR code as an input, oversampling modules of the QR code by dividing each module to on average F*F sample elements for forming an oversampling matrix, and wherein F is an integer greater than 1, determining intensity for each sample element in the oversampling matrix, the sample elements of the oversampled matrix having oversampled coordinates, wherein the method further comprises:

calculating an average intensity of the oversampling matrix, subtracting the average intensity from intensity of each sample element in the oversampling matrix, filtering intensity values for determining an average value for each sample element, determining a position of a sample element corresponding to a center of each module and determining color of each module based on intensities of sample elements corresponding to the center of each module by using iteration as follows, forming a queue Q comprising data structures of the modules, wherein data structures comprise information on the position of the center of the module, the color of the module and position of a module in the QR code, creating a first list position (x,y) of the module (x,y) and 8 neighbour modules for a data structure of module (x,y) being a first data structure in the queue Q for which center position and color are unknown, calculating a sample element corresponding an estimated oversampled coordinate (Ex,Ey) of center of the module (x,y) based on neighbour modules whose centers are known, defining a predetermined number of offset sample element candidates OC, wherein said offset sample element candidates OC are (dx,dy), where dx and dy belong to set {−1, 0, +1}, providing a set of color combination hypotheses for modules, whose center in unknown, and performing the following steps for each offset sample element candidates and for each color combination hypotheses:

providing a second list comprising intensities of said offset sample element candidates OC by reading intensity of each of the said offset sample element candidates from the oversampling matrix around E and corresponding locations of neighbour modules, wherein E is the estimated oversampled coordinate (Ex,Ey) of center of the module (x,y), providing a third list of 9 color hypotheses (CH) corresponding to the intensities of sample elements in the second list, correlating the second and third lists and storing the correlation result for determining a sample element corresponding to the offset sample element candidate with highest correlation value for the center of the module (x,y), and determining the color of the module (x,y) by picking an intensity value of the offset sample element candidate with highest correlation value from the oversampling matrix.

10. A device for correcting a geometrically distorted QR code comprising means for performing a method for correcting and interpreting an image of a geometrically distorted QR code comprising a modular structure by computer means, wherein the method comprises;

providing a geometrically distorted QR code and position coordinates of three outer corners of the QR code as an input, oversampling modules of the QR code by dividing each module to on average F*F sample elements for forming an oversampling matrix, and wherein F is an integer greater than 1, determining intensity for each sample element in the oversampling matrix, the sample elements of the oversampled matrix having oversampled coordinates, wherein the method further comprises:

calculating an average intensity of the oversampling matrix, subtracting the average intensity from intensity of each sample element in the oversampling matrix, filtering intensity values for determining an average value for each sample element, determining a position of a sample element corresponding to a center of each module and determining color of each module based on intensities of sample elements corresponding to the center of each module by using iteration as follows, forming a queue Q comprising data structures of the modules, wherein data structures comprise information on the position of the center of the module, the color of the module and position of a module in the QR code, creating a first list position (x,y) of the module (x,y) and 8 neighbour modules for a data structure of module (x,y) being a first data structure in the queue Q for which center position and color are unknown, calculating a sample element corresponding an estimated oversampled coordinate (Ex,Ey) of center of the module (x,y) based on neighbour modules whose centers are known, defining a predetermined number of offset sample element candidates OC, wherein said offset sample element candidates OC are (dx,dy), where dx and dy belong to set {−1, 0, +1}, providing a set of color combination hypotheses for modules, whose center in unknown, and performing the following steps for each offset sample element candidates and for each color combination hypotheses:

providing a second list comprising intensities of said offset sample element candidates OC by reading intensity of each of the said offset sample element candidates from the oversampling matrix around E and corresponding locations of neighbour modules, wherein E is the estimated oversampled coordinate (Ex,Ey) of center of the module (x,y), providing a third list of 9 color hypotheses (CH) corresponding to the intensities of sample elements in the second list, correlating the second and third lists and storing the correlation result for determining a sample element corresponding to the offset sample element candidate with highest correlation value for the center of the module (x,y), and determining the color of the module (x,y) by picking an intensity value of the offset sample element candidate with highest correlation value from the oversampling matrix.

11. The device according to claim 10, wherein the device comprises an image sensor for capturing an image of the geometrically distorted QR code or means for receiving image data of the geometrically distorted QR code.

12. The device according to claim 10, wherein the device is a mobile phone, mobile computer, tablet computer or QR code scanner.

* * * * *